US006757536B1

(12) United States Patent
Kim et al.

(10) Patent No.: US 6,757,536 B1
(45) Date of Patent: Jun. 29, 2004

(54) METHOD OF PROVIDING SITE SELECTION DIVERSITY IN MOBILE COMMUNICATION SYSTEM

(75) Inventors: Jae-Yoel Kim, Kunpo-shi (KR); Hyun-Woo Lee, Suwon-shi (KR); Seong-Ill Park, Kunpo-shi (KR); Sung-Ho Choi, Songnam-shi (KR); Ho-Kyu Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 486 days.

(21) Appl. No.: 09/722,852

(22) Filed: Nov. 27, 2000

(30) Foreign Application Priority Data

Nov. 26, 1999 (KR) ........................................ 1999-54336
Jan. 10, 2000 (KR) ........................................ 2000-982

(51) Int. Cl.[7] ........................................ H04Q 7/20

(52) U.S. Cl. ........................ 455/436; 455/439; 455/440; 455/524; 455/525; 455/437

(58) Field of Search ................................ 455/440, 436, 455/439, 524, 525, 437

(56) References Cited

U.S. PATENT DOCUMENTS 6,035,197 A * 3/2000 Haberman et al.
6,434,390 B2 * 8/2002 Rahman

* cited by examiner

*Primary Examiner*—Sinh Tran
*Assistant Examiner*—Huy Nguyen
(74) *Attorney, Agent, or Firm*—Dilworth & Barrese LLP

(57) ABSTRACT

There is provided a method of providing site selection diversity in a mobile communication system. If an active set is updated, the category of the old active set is compared with that of the updated active set. According to the comparison result, station (BS) identification (ID) codes are reassigned to base stations in the updated active base set. The reassigned BS ID codes are transmitted to the corresponding base stations and the category of the updated active set is transmitted to all the base stations of the updated active set.

5 Claims, 6 Drawing Sheets

METHOD OF PROVIDING SITE SELECTION DIVERSITY IN MOBILE COMMUNICATION SYSTEM

PRIORITY

This application claims priority to an application entitled "Transmitting Device and Method Using Site Selection Diversity in Mobile Communication System" filed in the Korean Industrial Property Office on Nov. 26, 1999 and assigned Ser. No. 1999-54336 and another application entitled "Transmitting Device and Method Using Site Selection Diversity in Mobile Communication System" filed in the Korean Industrial Property Office on Jan. 10, 2000 and assigned Ser. No. 2000-982, the contents of which are hereby incorporated by references.

BACKGROUND OF THE INVENTION

1. Field of the Invention

The present invention relates generally to a handover process in a mobile communication system, and in particular, to a method of assigning to a base station (BS) a BS identification (ID) code when a mobile station (MS) is to select a site for handover.

2. Description of the Related Art

Once a MS enters a handover region, the MS implements a handover process by communicating with a plurality of adjacent BSs as well as with a serving BS. To implement the handover, the MS receives signals from the adjacent BSs, each of the BS transmit the same data to the MS. Inherent therein is interference which leads to deterioration of system performance.

To overcome the problems, an SSDT (Site Selection Diversity Transmit) scheme is employed for the handover. The SSDT scheme is the process in which the MS selects a BS considered the best in reception performance among the participating BSs(active set), notifies the selected BS to the participating BSs, and receives data from the selected BS only. The receipt of a signal from the selected BS only reduces the interference. In addition, since the MS selects the BS from which the MS receives a signal with high signal strength, the time required for the handover is decreased.

FIG. 1 illustrates an SSDT procedure. Referring to FIG. 1, while a BS is communicating with a MS, a BS network (Radio Access Network) requests the MS to measure the strengths of signals received from adjacent BSs. The MS measures received signal strengths and informs the BS network of the measurements. The BS network implements a soft handover based on the measurements and determines whether to provide the SSDT function. Prior to implementation of the SSDT, the BS network sets an active set and informs the BSs of the active set that the SSDT has initiated and that they are in the active set. Upon receipt of confirmations from the BSs, the BS network informs the BSs of an SSDT action time and the MS of the SSDT action time and the active set. Then, the BSs of the active set and the MS initiate the SSDT at the action time. The MS designates a BS whose signal is received with good quality as a primary BS and the other BSs in the active set as non-primary BSs. The MS encodes the ID number of the primary BS and transmits it to all the BSs in the active set so that the BSs are informed of the primary BS by decoding the ID code. The primary BS continues data transmission, while the non-primary BSs discontinue data transmission.

In a UMTS (Universal Mobile Telecommunications System) system, for example, the BSs receive the BS ID code on a reverse DPCCH (Dedicated Physical Control Channel) of the MS. A DPCCH frame is shown in FIG. 2. The DPCCH frame includes 15 slots, each slot having four fields, PILOT, TFCI (Transport Format Combination Indicator), FBI (Feed Back Information), and TPC (Transport Power Control). The BS ID code is transmitted via the FBI field.

An error may be generated when the primary BS decodes the ID code. The decoding error results in discontinuation of data transmission in the primary BS because it does not know that it has been designated as a primary BS. If the non-primary BSs are informed accurately as to what BS was designated as a primary BS, they also discontinue data transmission. Consequently, all the BSs in communication with the MS discontinue data transmission, thereby dropping a call.

Accordingly, it is very important to design an ID code representative of a primary BS in the SSDT operation to select one BS to communicate with in a handover region. AWGN (Additive White Gaussian Noise) is taken into account in designing ID codes currently. In this environment, the ID code is designed based on Hamming distance related with the whole code length.

The problem of the conventional ID codes is that they were designed in the AWGN environment only. The ID codes do not show good performance in a real mobile communication environment that also experiences fading, which implies that designing of the ID codes based on the Hamming distance of the whole ID codes is not appropriate. Without fading, it can be assumed that ID codes susceptible to decoding errors are distributed with a uniform probability in position. However, this is not the case when fading occurs. Therefore, it is preferable to design ID codes with due consideration given to fading channels. Besides, an active set must be updated frequently to implement a handover more efficiently in the mobile communication system.

SUMMARY OF THE INVENTION

It is, therefore, an object of the present invention to provide a method of generating a BS ID code representative of a primary BS taking fading into account in a mobile communication system.

It is another object of the present invention to provide a method of selecting a BS as a primary BS using an ID code with less decoding errors involved.

It is a further object of the present invention to provide a method of reassigning BS ID codes to adapt to a change in an active set when a MS measures the strengths of signals from a plurality of BSs and selects a BS considered best in reception quality for handover in a mobile communication system.

It is a further another object of the present invention to provide a new method of signal transmission process for SSDT performance improvement.

To achieve the above objects, a method of signal transmission in a mobile communication system having a mobile station communicates with a serving base station and a plurality of adjacent base stations, and a controller for controlling the base stations, comprising the steps of measuring reception strengths of signals received from the base stations and reporting the received signal measurements to the serving base station by the mobile station, reporting the received signal measurements to the controller by the serving base station, determining active base stations based on the received signal measurements, each active base station ID numbers and an active set category of the active base station, and transmitting the ID numbers to the base stations when there is category change of the active set by the controller, transmitting the base station ID numbers to the mobile station by the serving base station, selecting a base station which have the most high reception power level and generating ID code corresponding ID number of the selected base station by the mobile station.

To achieve the above objects, a method of providing site selection diversity in a mobile communication system having a mobile station communicates with a serving base station and a plurality of adjacent base stations, and a controller for controlling the base stations, comprising the steps of measuring reception strengths of signals received from the base stations and reporting the received signal measurements to the serving base station by the mobile station, reporting the received signal measurements to the controller by the serving base station, determining a category of a current active set of the mobile station based on the received signal measurements by the controller, comparing the category of a previous active set with the category of the current active set by the controller, reassigning an ID number of a base station retracted from a previous active set to a different base station in the current active set by the controller, if the category of the previous active set is greater than the category of the current active set, transmitting the reassigned base station ID number to the different base station and the category of the current active set to the base stations in the current active set by the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

On the assumption that a MS encodes a BS ID number and transmits the BS ID code via the FBI field of a DPCCH, the embodiments of the present invention will be described in conjunction with an IMT-2000 system though it is applicable to other systems.

The present invention relates to designing of BS ID codes less likely to generate decoding errors that adapt to fading characteristics in selecting a particular BS in order to reduce downlink interference during a soft handover in a DS (Direct Sequence)-CDMA cellular mobile communication system.

Figure 3:
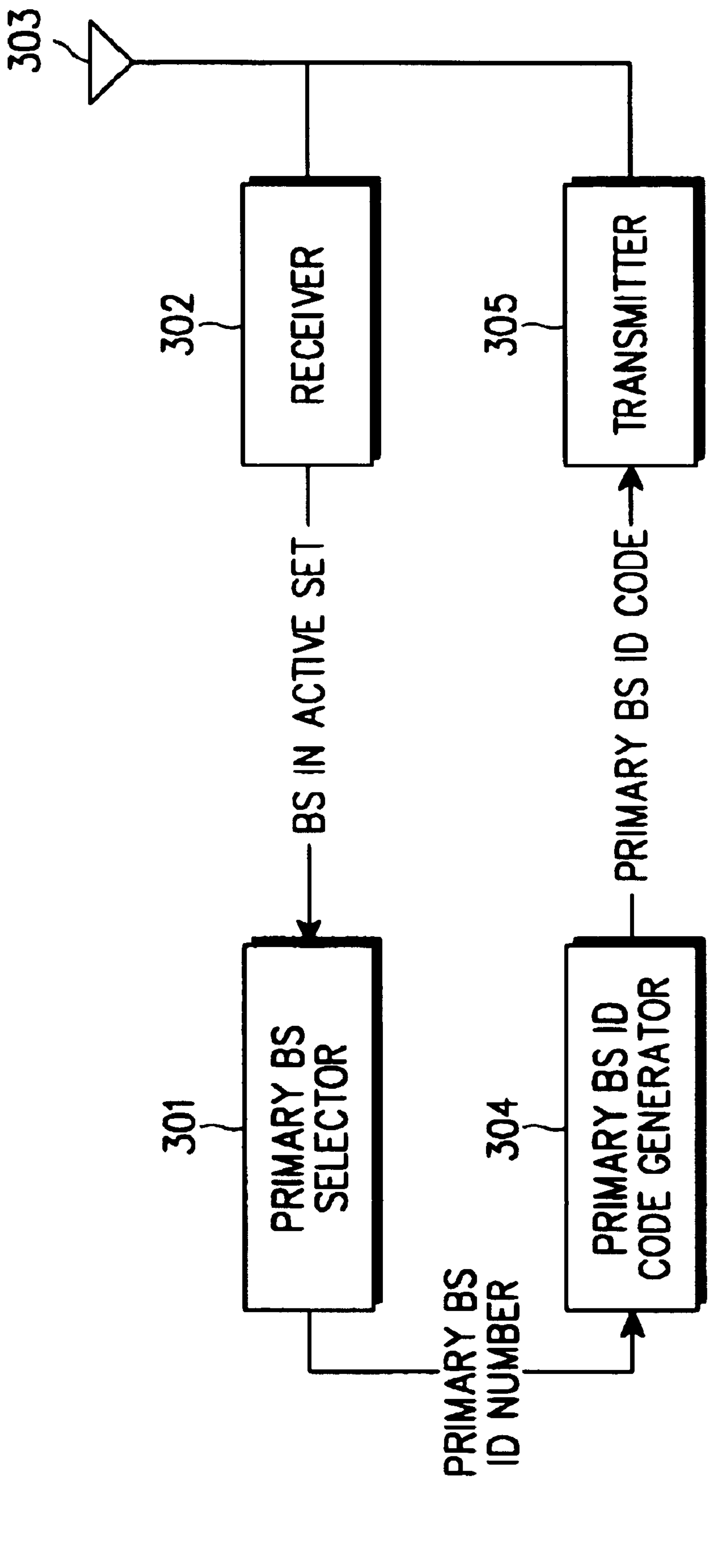
FIG. 3 is a schematic block diagram of a MS that transmits a BS ID code.

FIG. 3 illustrates the basic structure of an MS for selecting a BS. Referring to FIG. 3, a receiver 302 processes a signal received through an antenna 303. A primary BS selector 301 receives signals of the BSs in an active set from the receiver 302 and selects a primary BS. A primary BS ID code generator 304 generates a code corresponding to the ID number of the primary BS. The BS ID code is designed to take into account the fading characteristic of the mobile communication environment. A transmitter 305 mixes the BS ID code with other data and transmits the resulting signal.

Figure 1:
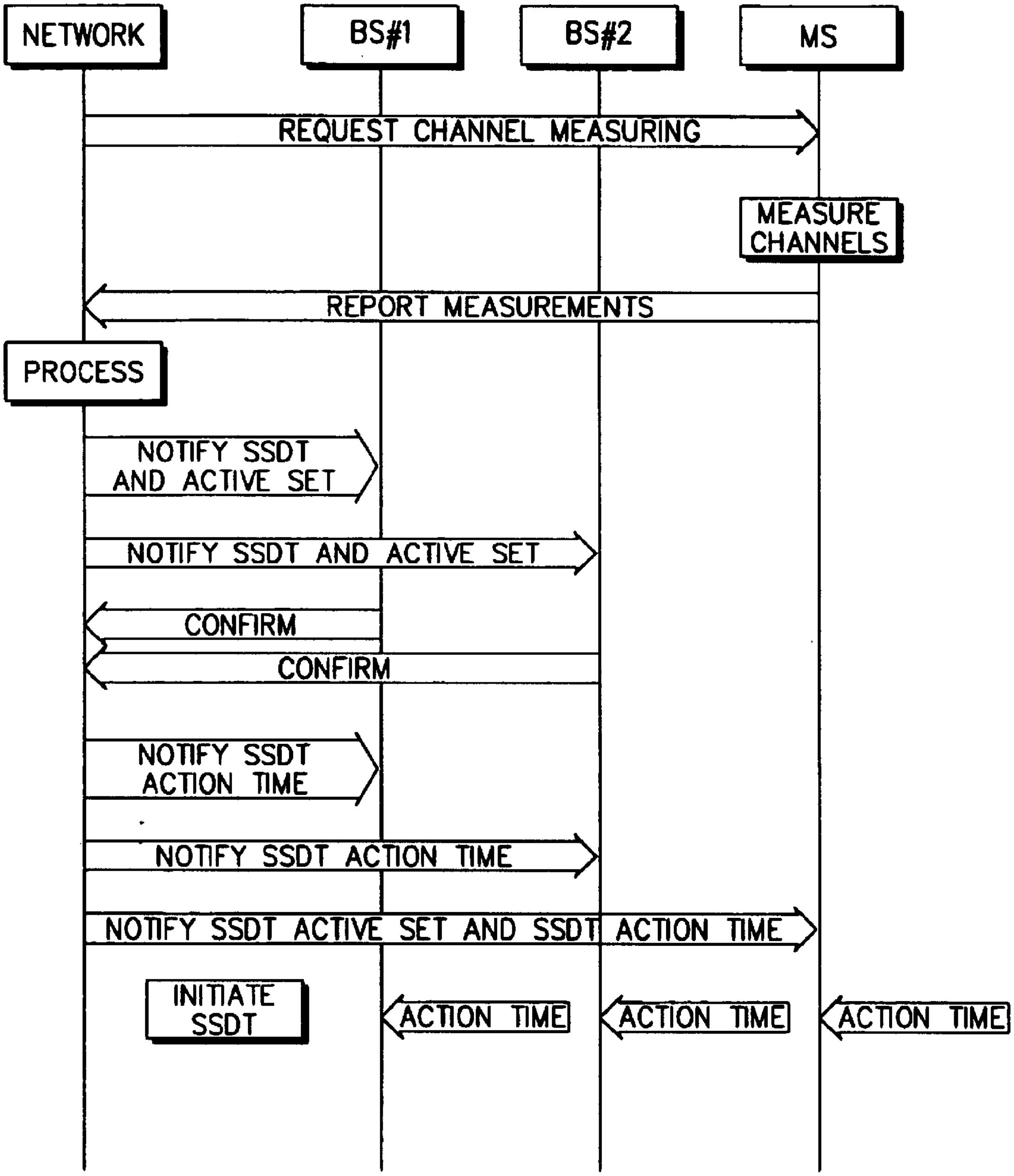
FIG. 1 illustrates a BS selecting procedure in a mobile communication system.
Figure 2:
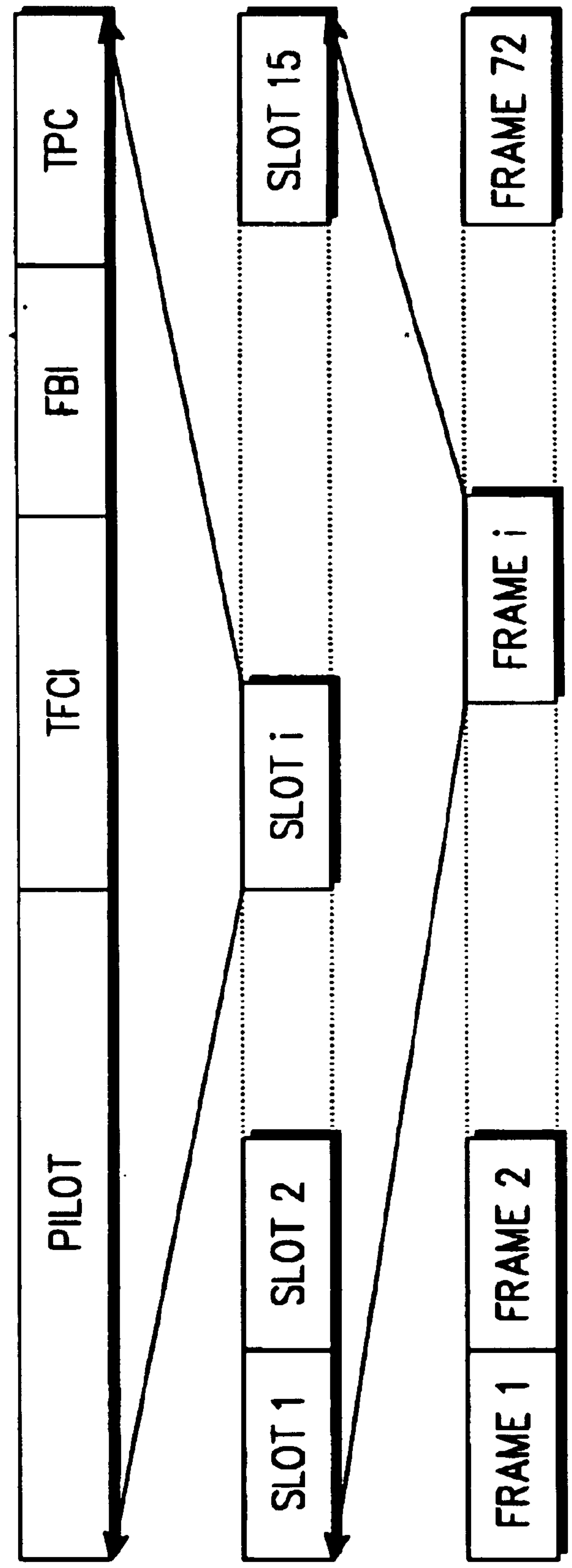
FIG. 2 illustrates the structure of a reverse control channel frame based on the IMT-2000 standards.
Figure 4:
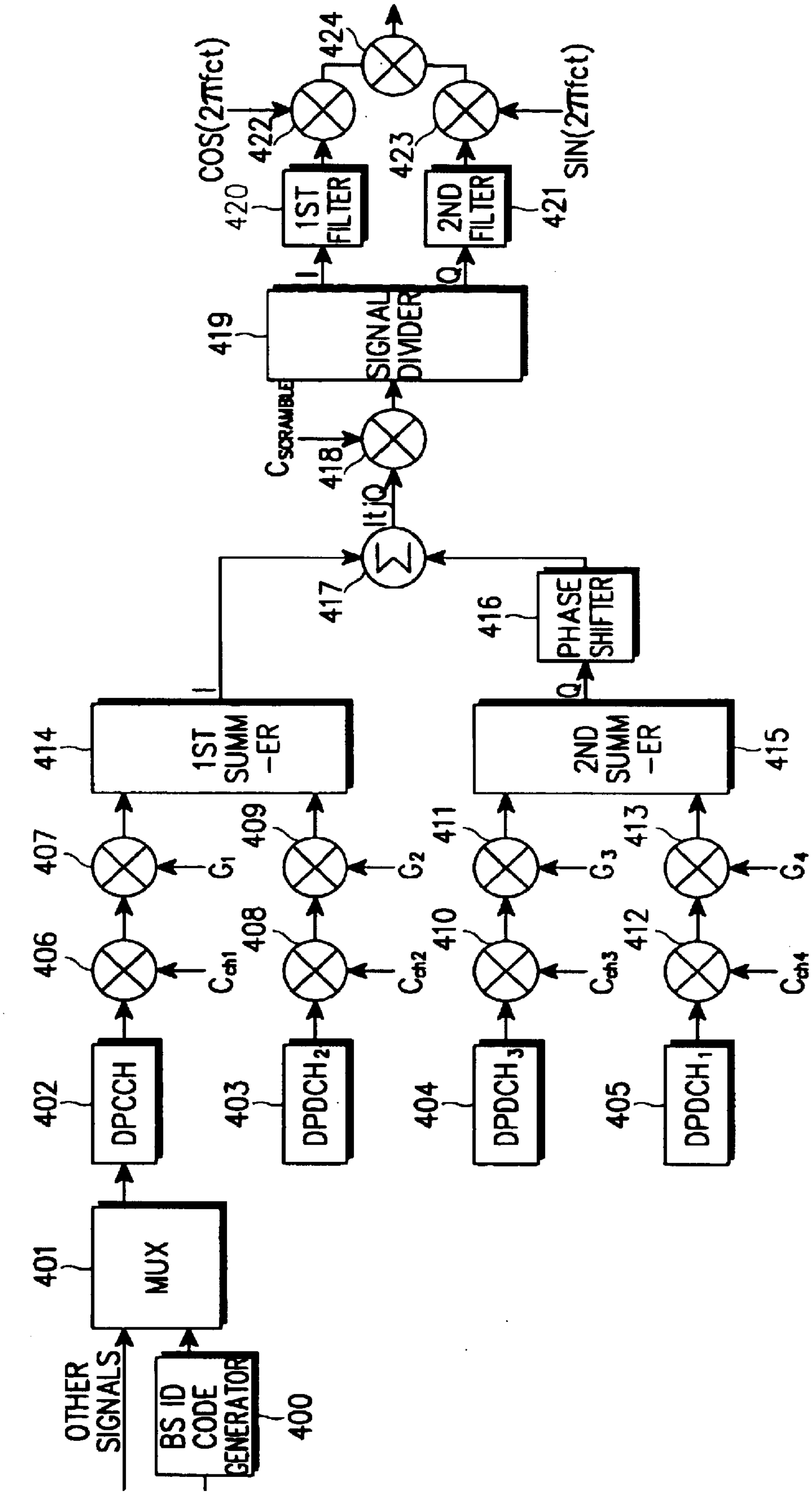
FIG. 4 is a block diagram of a transmitter for transmitting the BS ID code in the MS.

FIG. 4 is a detailed block diagram of the transmitter 305. Referring to FIG. 4, a BS ID code generator 400 encodes the ID number of the primary BS to communicate with during a handover. A multiplexer (MUX) 401 multiplexes the BS ID code with other signals in a predetermined frame format. The other signals may include a pilot, TFCI, and TPC. The multiplexed BS ID code is transmitted via the FBI field. The output of the MUX 401 is sent to a DPCCH 402 in the format shown in FIG. 2. A multiplier 406 multiplies the DPCCH message 402 by a channelization code Cch1 assigned to the DPCCH, thereby generating a spread DPCCH signal. A multiplier 407 multiplies the spread DPCCH signal by a gain control signal G1 for the DPCCH.

Multipliers 408, 410, and 412 multiply corresponding data channel messages $DPDCH_1$ 403, $DPDCH_2$ 404, and $DPDCH_3$ 405 by their respective channelization codes, Cch2, Cch3, and Cch4, thereby spreading the dedicated data channel messages. Multipliers 409, 411, and 413 multiply the spread dedicated data channel signals by corresponding gain control signals G2, G3, and G4, respectively.

A first summer 414 sums the DPCCH and $DPDCH_1$ signals received from the multipliers 407 and 409 and outputs the sum as an I channel signal. A second summer 415 sums the $DPDCH_2$ and $DPDCH_3$ signals received from the multipliers 411 and 413 and outputs the sum as a Q channel signal to a phase shifter 416. An adder 417 adds the outputs of the first summer 414 and the phase shifter 416 and outputs a complex signal (I+jQ). A multiplier 418 multiplies the complex signal by a scrambling code Cscramble assigned to the MS. A signal divider 419 divides the complex signal received from the multiplier 418 into a real number component and an imaginary number component. First and second filters 420 and 421 filter the real number component and the imaginary number component and multipliers 422 and 423 multiply the outputs of the filters 420 and 421 by corresponding carriers, respectively. An adder 424 adds the outputs of the multipliers 422 and 423.

Figure 5:
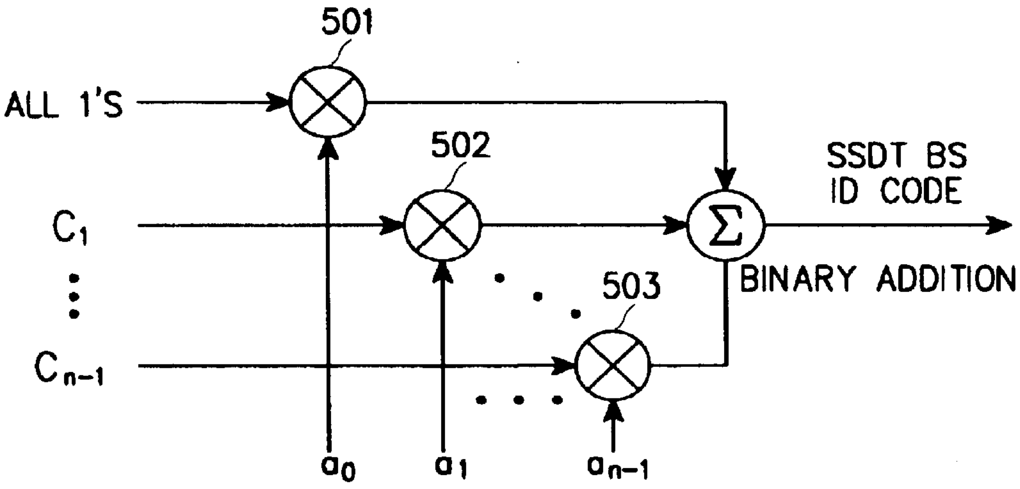
FIG. 5 illustrates the structure of a BS ID code generator.

FIG. 5 illustrates the structure of the BS ID code generator 400. The BS ID code generator 400 can be implemented by use of a look-up table if code length is short.

Referring to FIG. 5, $a_0, a_1, \ldots, a_{n-1}$ is a BS ID number expressed in terms of a binary number with $a_{n-1}$ as a MSB (Most Significant Bit). For example, if the BS ID number is 6, $a_0$=0, $a_1$=1, and $a_2$32 1. A multiplier 501 multiplies a code with all is by the first symbol of the BS ID number $a_0$. A multiplier 502 multiplies a first basic code by the second symbol of the BS ID number $a_1$. A multiplier 503 multiplies an $(n-1)^{th}$ basic code by the $n^{th}$ symbol of the BS ID number. An adder 504 subjects the products received from the multipliers 501 to 503 to binary addition. As compared to the conventional method, the BS ID code generator 400 according to the present invention has excellent performance particularly when fading occurs, by determining the basic codes in the following way.

In accordance with the present invention, BS ID codes are designed to adapt to the fading environment. Upon input of the SSDT BS ID number $(a_{n-1}, \ldots, a_1, a_0)$ expressed as a binary number of digits 0 to $2^n$, the multiplier 501 multiples ao by a bit sequence with all is and the multiplier 502 multiplies $a_1$ by a bit sequence with each bit value being 1 or −1. In this manner, the other multipliers perform multiplication. The summer 504 XOR-gates the outputs of the multipliers 501 to 503.

The basic codewords are the most significant factor to designing the BS ID code generator shown in FIG. 5. The design varies with the number of BS ID numbers, code length, and the length of a code per slot. If the basic codewords are given and the code length is not too long, the BS ID codes may be listed in a look-up table and stored in a memory.

Let a basic codeword be $C_i$ (i=0 1, . . . , n−1) and let the code vector of a BS ID number l, transmitted in an $i^{th}$ slot, be $A_{i,l}$ (i=0, 1, I−1, l=0, 1, . . . , N−1) if a plurality of code bits are transmitted in one slot. $C_i$ and $A_{i,l}$ are achieved in the method as described below.

1. The number N of elements in a set to be coded is determined, satisfying $$N=2n \tag{1}$$

2. The length of an ID code is determined. If a desired code length is D, the length L of a generated code is $$L=2^{[log_2 D]} \tag{2}$$

An excess of the generated code length over the desired code length is deleted, sequentially from the end of the generated code.

3. It is determined how many code bits to transmit in one slot. The number f of code bits per slot is a natural number satisfying $$F=\left[\frac{L}{f}\right] \tag{3}$$

where [x] is an integer equal to or greater than x.

4. An N×L matrix is built by $$B=[b_{ij}],\ i=0, 1, \ldots, N-1, j=0, 1, \ldots, L-1 \tag{4}$$

5. Such matrixes as shown in Eq. (5) are made.

$$S_m^0=\begin{bmatrix} S_{m-1}^0 & S_{m-1}^0 \\ S_{m-1}^0 & \overline{S_{m-1}^0} \end{bmatrix}\quad S_m^1=\begin{bmatrix} S_{m-1}^1 & S_{m-1}^1 \\ S_{m-1}^1 & \overline{S_{m-1}^1} \end{bmatrix} \tag{5}$$

where m=1, 2, 3, . . . , m−1.

6. The $b_{i,j}$ is given as $$b_{2j,\ Fj+Q(j,\ f)}=S^0{}_{n-1}(i, j)$$

$$b_{2*i+1,\ F*j+Q(j,\ f)}=S^1{}_{n-1}(i, j) \tag{6}$$

where i=0, 1, . . . , $$\left(\frac{N}{2}-1\right),$$

j is an integer satisfying 0≦Fj+Q(j, f)<L, and Q(x, y) is the remainder of dividing x by y.

7. From Eq. (6), the basic code is expressed as $$C_i=[c_{i,j}]=[b_{2^{i+1},\ j}],\ i=1, 2, \ldots, n-1, j=0, 1, \ldots, L-1 \tag{7}$$

8. The vector $A_{i,l}$ of the BS ID number transmitted in the $i^{th}$ slot is computed using Eq. (6) as $$A_{i,\ l}=[b_{l,\ i}, b_{1,\ F+i}, b_{1,\ 2F+i}, \ldots, b_{1,\ fF+i}],\ i=0, 1, \ldots, F-1,\ 1=0, 1, \ldots, N-1 \tag{8}$$

An embodiment of generating the basic codewords will be described using Eq. (1) to Eq. (8). If a total of eight BS ID numbers are used (N=8), code length is 16 (D=16), and two bits are transmitted per slot (f=2), 1. n=3 according to Eq. (1) and two basic codewords must be obtained.
2. L=16 according to Eq. (2).
3. F=8 according to Eq. (3).
4. Form an 8×16 matrix.
5. Then, the following matrix results according to Eq. (5).

$$S_2^0=\begin{bmatrix} 0&0&0&0&0&0&0&0&0&0&0&0&0&0&0&0 \\ 0&1&0&1&0&1&0&1&1&0&1&0&1&0&1&0 \\ 0&1&0&1&0&1&0&1&0&1&0&1&0&1&0&1 \\ 0&0&0&0&0&0&0&0&1&1&1&1&1&1&1&1 \end{bmatrix}$$

$$S_2^1=\begin{bmatrix} 1&1&1&1&1&1&1&1&1&1&1&1&1&1&1&1 \\ 1&0&1&0&1&0&1&0&0&1&0&1&0&1&0&1 \\ 1&0&1&0&1&0&1&0&1&0&1&0&1&0&1&0 \\ 1&1&1&1&1&1&1&1&0&0&0&0&0&0&0&0 \end{bmatrix}$$

6. Thus, a matrix B is given as $$B=\begin{bmatrix} 0&0&0&0&0&0&0&0&0&0&0&0&0&0&0&0 \\ 1&1&1&1&1&1&1&1&1&1&1&1&1&1&1&1 \\ 0&0&0&0&0&0&0&0&1&1&1&1&1&1&1&1 \\ 1&1&1&1&1&1&1&1&0&0&0&0&0&0&0&0 \\ 0&1&0&1&0&1&0&1&0&1&0&1&0&1&0&1 \\ 1&0&1&0&1&0&1&0&1&0&1&0&1&0&1&0 \\ 0&1&0&1&0&1&0&1&1&0&1&0&1&0&1&0 \\ 1&0&1&0&1&0&1&0&0&1&0&1&0&1&0&1 \end{bmatrix}$$

7. From Eq. 7, the basic codewords are $C_1$=0000000011111111

$C_2$=0101010101010101

8. $A_{i,\ l}$ is computed using Eq. (8) as shown in Table 1.

TABLE 1

| BS ID number | BS ID code $A_{i,1}$ |
|---|---|
| 0 | 0000 000(0)<br>0000 000(0) |
| 1 | 1111 111(1)<br>1111 111(1) |
| 2 | 0000 000(0)<br>1111 111(1) |
| 3 | 1111 111(1)<br>0000 000(0) |
| 4 | 0101 010(1)<br>0101 010(1) |
| 5 | 1010 101(0)<br>1010 101(0) |

TABLE 1-continued

| BS ID number | BS ID code $A_{i,1}$ |
|---|---|
| 6 | 0101 010(1) |
| | 1010 101(0) |
| 7 | 1010 101(0) |
| | 0101 010(1) |

Table 1 shows long type BS ID codes that are transmitted at two code bits per slot. For a BS ID number 6, for example, the matrix of $A_{i,6}$ (i=0, 1, . . . , 7) is read down by columns. Thus, {0, 1} is read from the first column for the first slot and {1, 0} from the second column for the second slot. Since one frame includes 15 slots, the bits in the brackets in the eighth columns are excluded from the fourth transmission in the frame so that the BS ID number may occur twice in the frame.

Table 2 shows intermediate type BS ID codes and short type BS ID codes that are transmitted at two code bits per slot.

TABLE 2

| | BS ID code $A_{i,1}$ | |
|---|---|---|
| BS ID number | intermediate type | Short type |
| 0 | 000(0) | 000 |
| | 000(0) | 000 |
| 1 | 111(1) | 111 |
| | 111(1) | 111 |
| 2 | 000(0) | 000 |
| | 111(1) | 111 |
| 3 | 111(1) | 111 |
| | 000(0) | 000 |
| 4 | 010(1) | 010 |
| | 010(1) | 010 |
| 5 | 101(0) | 101 |
| | 101(0) | 101 |
| 6 | 010(1) | 010 |
| | 101(0) | 101 |
| 7 | 101(0) | 101 |
| | 010(1) | 010 |

In case of the intermediate type, a whole BS ID code is transmitted in four slots. Since one frame is 15 slots, the BS ID code is repeated four times in one frame by four slots for the first three times and by three slots for the fourth time, with the code bits in the fourth column of the intermediate type excluded from the fourth transmission. In the case of the short type, the BS ID code occurs five times in one frame because three slots is needed for one time-transmission of the BS ID code. The short and intermediate types are formed by truncating excesses of the long type over the short and intermediate types, sequentially from the end of the long type code.

Now another embodiment of the BS ID code generator will be described. If a total of eight BS ID numbers exist (N=8), code length is 15 (D=15), and a BS ID code is transmitted at one bit per slot (f=1), 1. n=3 according to Eq. (1) and two basic codewords must be obtained.
2. L=16 according to Eq. (2).

3. F=16 according to Eq. (3).
4. A 8×16 matrix is formed.
5. Then, the following matrixes result from Eq. (5).

$$S_2^0 = \begin{bmatrix} 0 & 0 & 0 & 0 & 0 & 0 & 0 & 0 & 0 & 0 & 0 & 0 & 0 & 0 & 0 & 0 \\ 0 & 1 & 0 & 1 & 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 & 0 & 0 & 1 & 1 \\ 0 & 1 & 1 & 0 & 0 & 1 & 1 & 0 & 0 & 1 & 1 & 0 & 0 & 1 & 1 & 0 \end{bmatrix}$$

$$S_2^1 = \begin{bmatrix} 1 & 1 & 1 & 1 & 1 & 1 & 1 & 1 & 1 & 1 & 1 & 1 & 1 & 1 & 1 & 1 \\ 1 & 0 & 1 & 0 & 1 & 0 & 1 & 0 & 1 & 0 & 1 & 0 & 1 & 0 & 1 & 0 \\ 1 & 1 & 0 & 0 & 1 & 1 & 0 & 0 & 1 & 1 & 0 & 0 & 1 & 1 & 0 & 0 \\ 1 & 0 & 0 & 1 & 1 & 0 & 0 & 1 & 1 & 0 & 0 & 1 & 1 & 0 & 0 & 1 \end{bmatrix}$$

6. Thus, the matrix B is $$B = \begin{bmatrix} 0 & 0 & 0 & 0 & 0 & 0 & 0 & 0 & 0 & 0 & 0 & 0 & 0 & 0 & 0 & 0 \\ 1 & 1 & 1 & 1 & 1 & 1 & 1 & 1 & 1 & 1 & 1 & 1 & 1 & 1 & 1 & 1 \\ 0 & 1 & 0 & 1 & 0 & 1 & 0 & 1 & 0 & 1 & 0 & 1 & 0 & 1 & 0 & 1 \\ 1 & 0 & 1 & 0 & 1 & 0 & 1 & 0 & 1 & 0 & 1 & 0 & 1 & 0 & 1 & 0 \\ 0 & 0 & 1 & 1 & 0 & 0 & 1 & 1 & 0 & 0 & 1 & 1 & 0 & 0 & 1 & 1 \\ 1 & 1 & 0 & 0 & 1 & 1 & 0 & 0 & 1 & 1 & 0 & 0 & 1 & 1 & 0 & 0 \\ 0 & 1 & 1 & 0 & 0 & 1 & 1 & 0 & 0 & 1 & 1 & 0 & 0 & 1 & 1 & 0 \\ 1 & 0 & 0 & 1 & 1 & 0 & 0 & 1 & 1 & 0 & 0 & 1 & 1 & 0 & 0 & 1 \end{bmatrix}$$

7. From Eq. (7), the basic codes are given as
$C_1$=0101010101010101
$C_2$=0011001100110011
8. $A_{i,l}$ is computed using Eq. (8) as shown in Table 3 that lists the long, intermediate, and short types.

TABLE 3

| | BS ID code $A_{i,1}$ | | |
|---|---|---|---|
| BS ID number | long type | intermediate type | short type |
| 0 | 0000000000000000 | 0000000(0) | 00000 |
| 1 | 1111111111111111 | 1111111(1) | 11111 |
| 2 | 0101010101010101 | 0101010(1) | 01010 |
| 3 | 1010101010101010 | 1010101(0) | 10101 |
| 4 | 0011001100110011 | 0011001(1) | 00110 |
| 5 | 1100110011001100 | 1100110(0) | 11001 |
| 6 | 0110011001100110 | 0110011(0) | 01100 |
| 7 | 1001100110011001 | 1001100(1) | 10011 |

Referring to Tables 1, 2, and 3, eight BS ID codes are used. The first two BS ID codes (for the ID numbers 0 and 1), the first four BS ID codes (for the ID numbers 0 to 4) and the eight BS ID codes form linear block codes, respectively. The first two BS ID codes have the most excellent performance with respect to code rates. The first four BS ID codes show more excellent performance than any other ID code set including the first two BS ID codes, and the above eight BS ID codes show excellent performance than any other different block codes.

The above-described BS ID codes are assigned to the BSs in an active set and the base station network notifies the MS of the BS ID numbers and each BS of the number of the BSs in the active set and the ID codes corresponding to the BS ID numbers. The performance of the SSDT scheme depends on what codes the base station network assigns to the BSs. For example, if two BSs A and B belong to the active set, assignment of the ID code corresponding to the BS ID number 0 to BS A and the ID code corresponding to the BS ID number 1 to BS B is better in performance than assignment of the ID corresponding to the BS ID number 0 to BS A and the ID code corresponding to the BS ID number 2 to BS B. If four BSs are included in the active set, it is preferable in performance to assign the ID codes corresponding to BS ID numbers 0, 1, 2, and 3 to the BSs.

Therefore, given one BS in the active set, the ID code corresponding to the BS ID number 0 is assigned to the BS. If two BSs are in the active set, the codes corresponding to the BS ID numbers 0 and 1 are assigned to the BSs. This active set is called category 1. If three or four BSs belong to the active set, one of the ID codes corresponding to the BS ID numbers 0, 1, 2, and 3 is assigned to each of the BSs. This active set is called category 2. If the number of BSs in the active set is 5 to 8, one of the eight ID codes is assigned to each BS in the active set. This active set is called category 3. The number of BSs in the active set varies at any time. If the active set is changed to a different category according to the change of the number of the BSs, the new category is checked and the BS ID codes are reassigned according to the changed category.

When the active set is shifted from category 2 to category 1, the base station network needs to reassign BS ID numbers to achieve better performance. For example, if BSs A, B, and C are assigned to the ID codes corresponding to the BS ID numbers 0, 1, and 2 in the active set of category 2 and then the BS B is retracted from the active set, the active set shifts to category 1, while the ID numbers 0 and 2 are still given to the BSs A and C, respectively. For better performance, the ID number of the BS C is changed to the ID number 1. If the BS ID numbers 0 to 4 are used in an active set of category 3 and then a BS with the ID number 2 is retracted from the active set, the active set is changed to category 2 and the base station network reassigns the BS ID numbers 0, 1, 2, and 3 to the remaining BSs. The reassignment occurs when the active set varies in category, as illustrated in FIG. 6.

Figure 6:
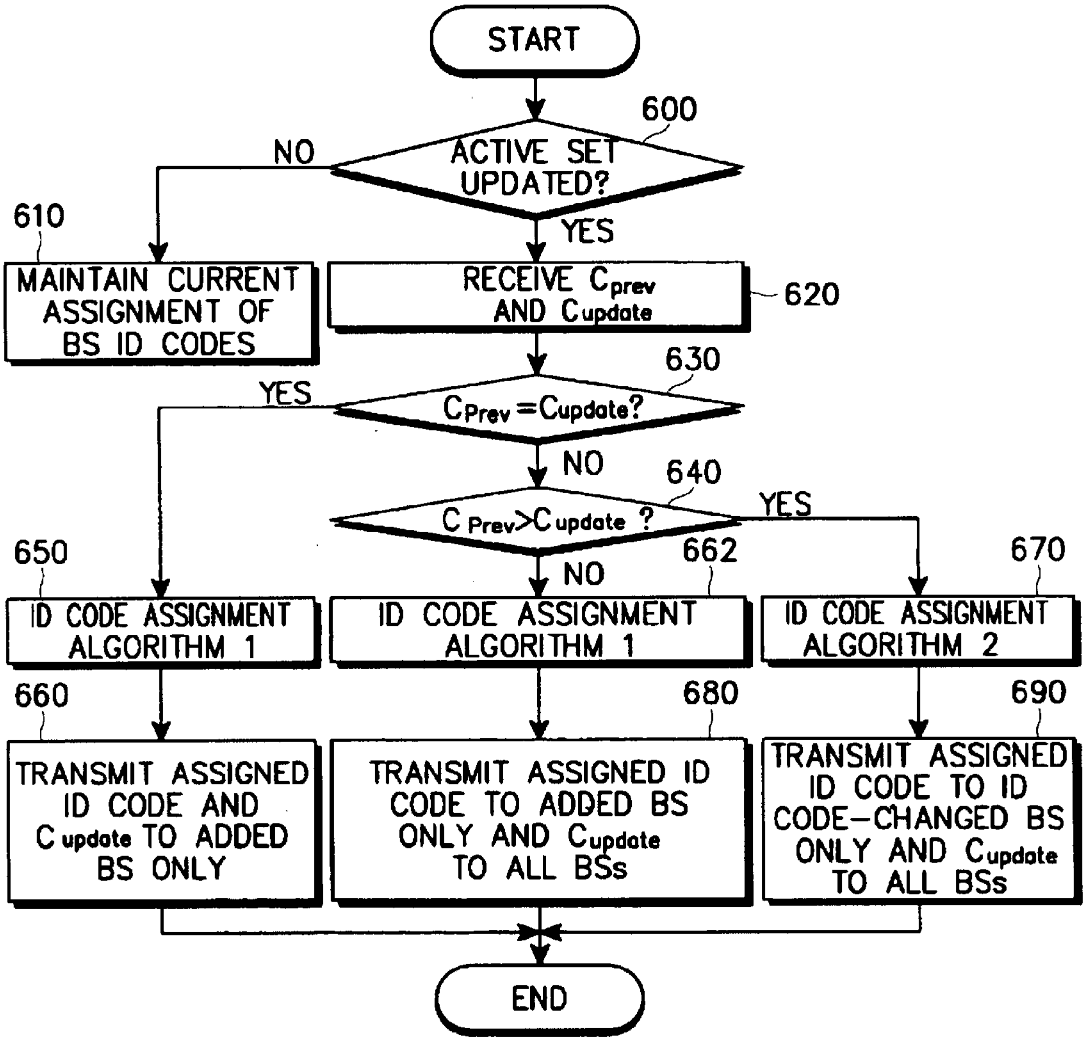
FIG. 6 is a flowchart of a BS ID code reassignment process when an active set is updated in a network.

Referring to FIG. 6, the BS network determines whether a current active set is updated in step 600. If the active set is not updated, the BS network maintains the current assignment of BS ID codes in the active set in step 610. If the active set is updated, the BS network receives the categories $C_{prev}$ and $C_{update}$ of the old and new active sets in step 620. If they are identical in step 630, the BS network performs an ID code assignment algorithm 1 in step 650. That is, if any BS is retracted from the current active set, the BS network deletes the ID code corresponding to the ID number of the BS. If a new BS is added to the active set, the BS network assigns an ID code corresponding to an available ID number within the category of the current active set to the new BS. Then, the BS network transmits the assigned ID code and the category of the active set to only the new BS in step 660. On the other hand, if the categories are different in step 630, the BS network compares the category $C_{prev}$ with the category $C_{update}$ in step 640. If $C_{update}$ is greater than $C_{prev}$, the BS network performs the ID code assignment algorithm 1 in step 662. In step 662, the BS network deletes the ID code assigned to, if any, a retracted BS and assigns a new available ID code within the changed category to, if any, an added BS. In step 680, the BS network transmits the assigned ID code to the added BS and the changed category to all the BSs in the updated active set.

If $C_{prev}$ is greater than $C_{update}$, the BS network recognizes this in step 640 and performs an ID code assignment algorithm 2 in step 670. In step 670, the BS network deletes the ID code assigned to, if any, a retracted BS and assigns a new available ID code within the changed category to, if any, an added BS. If an ID code unavailable to the updated category is still used, the ID code is deleted and an available ID code within the updated category is assigned. Alternatively, all of the old ID codes may be deleted and the ID codes available to the updated active set may be reassigned instead. In step 690, the BS network transmits the assigned ID code to the added BS and the changed category to all the BSs of the changed active set.

In accordance with the present invention, BS ID codes are generated in consideration for AGWN and fading for use in selecting a BS in a mobile communication system. Thus a MS can effectively select a BS with a signal having the greatest transmission strength among signals from a plurality of BSs. Furthermore, when an active set is updated, a BS network reassigns BS ID codes available to the updated active set to the BSs in the updated active set according to the characteristics of the ID codes, thereby increasing the performance of the ID codes.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of signal transmission in a mobile communication system having a mobile station communicate with a serving base station and a plurality of adjacent base stations, and a controller for controlling the base stations, comprising the steps of:

measuring reception strengths of signals received from the base stations and reporting the received signal measurements to the serving base station by the mobile station;

reporting the received signal measurements to the controller by the serving base station;

determining active base stations based on the received signal measurements, each active base station identification(ID) numbers and an active set category of the active base station, and transmitting the ID numbers to the active base stations when there is category change of the active set by the controller;

transmitting the base station ID numbers to the mobile station by the serving base station; and selecting a base station which have the most high reception power level and generating ID code corresponding to the number of the selected base station by the mobile station.

2. The method of claim 1, wherein an active set is classified into one of a first category of base station ID numbers 0 and 1, a second category of base station ID numbers 0, 1, 2, and 3, and a third category of base station ID numbers 0, 1, 2, 3, 4, 5, 6, and 7, and base station ID codes are given as the following table with respect to the base station ID numbers:

| base station ID number | base station ID code |
|---|---|
| 0 | 0000 000(0)<br>0000 000(0) |
| 1 | 1111 111(1)<br>1111 111(1) |
| 2 | 0000 000(0)<br>1111 111(1) |
| 3 | 1111 111(1)<br>0000 000(0) |
| 4 | 0101 010(1)<br>0101 010(1) |
| 5 | 1010 101(0)<br>1010 101(0) |
| 6 | 0101 010(1)<br>1010 101(0) |
| 7 | 1010 101(0)<br>0101 010(1) |

3. The method of claim 1, wherein an active set is classified into one of a first category of base station ID numbers 0 and 1, a second category of base station ID numbers 0, 1, 2, and 3 and a third category of base station ID numbers 0, 1, 2, 3, 4, 5, 6, and 7, and base station ID codes are given as the following table with respect to the base station ID numbers:

TABLE 2

| base station ID number | BS station ID code intermediate type | Short type |
|---|---|---|
| 0 | 000(0) | 000 |
| | 000(0) | 000 |
| 1 | 111(1) | 111 |
| | 111(1) | 111 |
| 2 | 000(0) | 000 |
| | 111(1) | 111 |
| 3 | 111(1) | 111 |
| | 000(0) | 000 |
| 4 | 010(1) | 010 |
| | 010(1) | 010 |
| 5 | 101(0) | 101 |
| | 101(0) | 101 |
| 6 | 010(1) | 010 |
| | 101(0) | 101 |
| 7 | 101(0) | 101 |
| | 010(1) | 010 |

4. A method of providing site selection diversity in a mobile communication system having a mobile station communicate with a serving base station and a plurality of adjacent base stations, and a controller for controlling the base stations, comprising the steps of:

measuring reception strengths of signals received from the base stations and reporting the received signal measurements to the serving base station by the mobile station;

reporting the received signal measurements to the controller by the serving base station;

determining a category of a current active set of the mobile station based on the received signal measurements by the controller;

comparing the category of a previous active set with the category of the current active set by the controller;

reassigning an ID number of a base station retracted from a previous active set to a different base station in the current active set by the controller, if the category of the previous active set is greater than the category of the current active set; and transmitting the reassigned base station ID number to the different base station and the category of the current active set to the base stations in the current active set by the controller.

5. The method of claim 4, further comprising the step of receiving the reassigned base station ID number and the category of the current active set, selecting a base station which have the most high reception power level and generating ID code corresponding to the ID number of the selected base station, and transmitting the base station ID code by the mobile station.

* * * * *